United States Patent Office 3,268,949
Patented August 30, 1966

3,268,949
HOUSING FOR SCREW EXTRUDERS
Norwin Schmidt, Kornwestheim, and Rudolf Paul Fritsch, Stuttgart-Weilimdorf, Germany, assignors to Werner & Pfleiderer, Stuttgart-Feuerbach, Germany, a German firm
Filed Mar. 19, 1965, Ser. No. 441,049
Claims priority, application Germany, Mar. 28, 1964, W 36,474
7 Claims. (Cl. 18—2)

The present invention relates to extrusion presses, and more particularly to extruders in which several worms or screws are rotatable side by side in a common housing or barrel. Such twin extruders are used, for instance, to work up and to extrude thermoplastic synthetic material and other thermoplastic materials.

Synthetic thermoplastic materials frequently contain fillers, such as pigments, which are generally very hard and have abrasive properties, thereby causing rapid and extensive wear in the extruders, and particularly at the housing or barrel thereof, thus correspondingly reducing the useful life of the extruders.

It is known to provide exchangeable protective liners in the housing, but liner arrangements as now known are not satisfactory for several reasons, which will be more fully pointed out hereinafter.

It is a broad object of the invention to provide a novel and improved device for protecting the housing or barrel of an extruder of the general kind above referred to against the wear caused by the frictional and abrasive properties of thermoplastic materials to be worked up in such extruders.

More particularly, it is an object of the invention to provide a novel and improved liner arrangement for the housing or barrel of extruders of the general kind above referred to, which arrangement permits a convenient and rapid exchange of the liners, secures installed liners in position and assures effective heat conduction from the liners to the housing wall proper, protection of the liners and the adjacent housing walls against corrosion, and protection of the thermoplastic material in the housing or barrel against contamination.

Other and further objects, features and advantages of the invention will be pointed out hereinafter and set forth in the appended claims constituting part of the application.

In the accompanying drawing a preferred embodiment of the invention is shown by way of illustration, and not by way of limitation.

Figure 1:
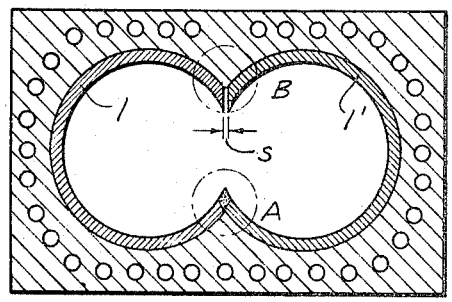
Figure 2:
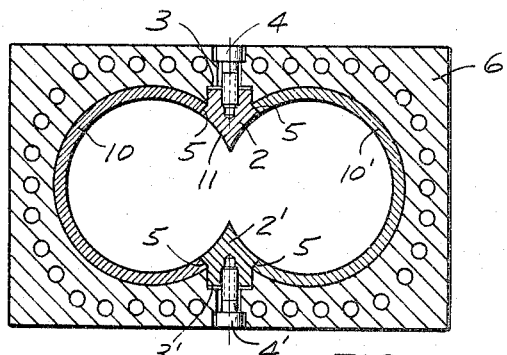

In the drawing:
FIG. 1 is a cross sectional view of a prior art lined extruder housing or barrel, and
FIG. 2 is a cross sectional view of a lined extruder housing or barrel according to the invention.

In both figures the extruder housing is shown in a diagrammatic fashion, and only those components of the extruder are shown which are essential for the understanding of the invention. It should be visualized that two screw or worm conveyors rotate in the housing in parallel relationship and are driven by suitable drive means. It should also be visualized that the extruder housing includes vent, feed and discharge ports, none of which are shown.

Referring first to prior art FIG. 1, this figure shows a housing in which are fitted protective liners 1 and 1'. The liners are inserted into the housing by any suitable means known for the purpose, such as hydraulic means. As is evident from the figure, the two liners have a generally cylindrical cross section, and the liners are disposed relative to each other so that the peripheral outlines of the two liners intersect. The resulting gap between the two cylindrical chambers or cavities formed by the two liners is constricted by the somewhat saddle-shaped encircled portions A and B. As previously pointed out, protective liners should be readily exchangeable to serve their purpose. In practice a slit S must be left between the two liners. The slit is shown open for the saddle portion B, but it is present at the saddle portion A also, though it is shown filled in at saddle portion A.

While the slits facilitate the insertion and withdrawal of the liners, they entail significant disadvantages.

The slits will be gradually filled with the thermoplastic material moving along the liners, and the material penetrating into the slits will become more or less scorched during operation. The scorched material in turn will gradually reenter the chambers and cause contamination of the material worked up within the same. As is readily apparent, the presence of impurities in the form of scorched thermoplastic material is a continuing problem, since fresh material will enter the slits as scorched material escapes from the same.

The situation is further aggravated due to the fact that unavoidably the edges of the liners defining slits S will gradually break off, whereby the slits will be widened. Such widening of the slits increases the capacity thereof for receiving thermoplastic material, and thus increases the amount of scorched material escaping into the fresh thermoplastic material passing through the chambers defined by the liners. The fresh material in the chambers is further contaminated by the metal particles broken off the edges of the liners.

The disadvantages inherent in the provision of slits S are well understood in the art. An attempt has been made to close the slits by welding, as is indicated at A, but while such closing of the slits reduces or even completely eliminates the discharge of impurities into the fresh thermoplastic material, it also makes an exchange of the liners very difficult, if not impossible.

Another significant disadvantage of the conventional liners as shown in FIG. 1 is that it is virtually impossible to obtain an intimate and uniform contact between the outer walls of the liners and the respective inner walls of the housing proper. As a result, the exchange of heat between the liners and the body of the housing is not uniform all along the facing wall portions of the liners and the housing. Furthermore, small cavities are present wherever the liners do not closely abut against the walls of the housing. Moisture unavoidably pentrates into such cavities and causes corrosion, which obviously is highly undesirable.

Turning now to FIG. 2, the liners 10 and 10' according to this figure which line the two generally cylindrical chambers in housing 6, are cut back at the points at which the peripheral outlines of the two liners intersect to form a wide gap between the respective liner ends 5. The body of housing 6 includes lengthwise grooves 3 and 3' the transverse width of which corresponds substantially to the spacing between liner ends 5. In each of the two grooves a saddle bar 2 or 2' is fitted. The surface portions of the two saddle bars facing inwardly have curvatures such that the inner peripheral outline of the liners as shown in FIG. 1 is substantially restored. As is clearly shown in FIG. 2, the depth of grooves 3 and 3' is such that there is clearance between the base of the grooves and the respective adjacent walls of bars 2 and 2' when the latter are in the illustrated positions. Each of the saddle bars is engaged by a tensioning means, shown as a screw bolt 4 and 4' respectively screwed through the respective housing wall into the bar. As is evident, tightening of the screw bolts, which can be conveniently effected from the outside, will pull the saddle bars outwardly in reference to the center axes of the liners.

As a result, the saddle bars are held tightly in position, and the liners are somwhat spread so that they are forced into tight and uniform contact with the confining wall surfaces of the housing.

To amplify the spreading action by tightening bolts 4 and 4', the liner edges 5 engaging the corresponding wall portions of bars 2 and 2' are preferably slanted to obtain a cam action. As is evident, the bars when tensioned are tightly held in position, and thus any turning of the liners within the housing is effectively restrained. The bars further strengthen the liners at the surface portions thereof at which the liners are subjected to the strongest forces.

To strengthen the liner arrangement further, the exposed surface portions of the saddle bars may be coated with a layer 11 of particularly abrasion-resistant material, such as a suitable hard metal, for instance, Xaloy.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. In a twin screw extruder for thermoplastic material, in combination, a housing including two parallel generally cylindrical chambers for receiving two rotary extrusion screws, the peripheral outlines of said chambers being in partly intersecting relationship, the lengthwise edge portions of the housing material at the points of intersection of said peripheral outlines defining a gap joining the two chambers, a generally cylindrical liner fitted in each of said chambers, said liners having in their peripheral walls lengthwise extending cut-outs in substantial registry with said edges of the housing material, said housing further including grooves extending parallel to said cylindrical chambers and being each disposed between said edge portions, and a saddle bar slidably inserted into each of said grooves to close said cut-outs in the liners.

2. A twin screw extruder according to claim 1, wherein each of said saddle bars has curved surface portions forming extensions of the inner peripheral surfaces of said liners, thereby correspondingly constricting the width of the gap between the two chambers.

3. A twin screw extruder according to claim 1, wherein an abrasive-resistant coating is provided on surface portions of said saddle bars facing the chambers.

4. In a twin screw extruder for thermoplastic material, in combination, a housing including two parallel generally cylindrical chambers for receiving two rotary extrusion screws, the peripheral outlines of said chambers being in partly intersecting relationship, the lengthwise edge portions of the housing material at the points of intersection of said peripheral outlines defining a gap joining the two chambers, a generally cylindrical liner fitted in each of said chambers, said liners having in their peripheral walls lengthwise extending cut-outs in substantial registry with said edges of the housing material, said housing further including grooves extending parallel to said cylindrical chambers and being each disposed between said edge portions, a saddle bar slidably inserted into each of said grooves to close said cut-outs in the liners, the depth of said grooves transversely of the center axes of said chambers being greater than the thickness of the saddle bars transversely of said center axes to permit displacement of said saddle bars in said transverse direction, and adjustable tensioning means for each of said saddle bars coacting with the same to effect a controlled transverse displacement of the bars, said displacement of the bars causing tightening of the same and spreading of the liners.

5. A twin screw extruder according to claim 4, wherein each of said saddle bars has curved surface portions forming extensions of the inner peripheral surfaces of said liners, thereby correspondingly constricting the width of the gap joining the two chambers.

6. A twin screw extruder according to claim 4, wherein wall portions of the saddle bars and of the liners engage each other with surface portions slanted in reference to the direction of displacement of the bars to effect said spreading of the liners by cam action upon displacement of the bars in outward direction in reference to said center axes of the chambers.

7. A twin screw extruder according to claim 4, wherein said tensioning means comprise screw means threaded into the saddle bars and operable from the outside of the housing.

References Cited by the Examiner

UNITED STATES PATENTS 2,519,834  8/1950  Hanson et al. _____ 18—2
3,010,151  11/1961  Dickinson et al. _____ 18—2 X WILLIAM J. STEPHENSON, *Primary Examiner.*